(12) United States Patent
Son et al.

(10) Patent No.: US 11,719,609 B2
(45) Date of Patent: Aug. 8, 2023

(54) APPARATUS FOR FATIGUE TESTING BULGE TOOL HAVING WH-TYPE SKELETON

(71) Applicant: KEPCO NUCLEAR FUEL CO., LTD., Daejeon (KR)

(72) Inventors: Se Ick Son, Sejong (KR); In Kyu Kim, Sejong (KR); Sung Jun Park, Gyeonggi-do (KR); Je Won Lee, Daejeon (KR); Young Duk Sim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 444 days.

(21) Appl. No.: 17/054,337

(22) PCT Filed: Jun. 4, 2018

(86) PCT No.: PCT/KR2018/006357
§ 371 (c)(1),
(2) Date: Nov. 10, 2020

(87) PCT Pub. No.: WO2019/216476
PCT Pub. Date: Nov. 14, 2019

(65) Prior Publication Data
US 2021/0088431 A1    Mar. 25, 2021

(30) Foreign Application Priority Data

May 8, 2018 (KR) .......................... 10-2018-0052632

(51) Int. Cl.
*G01N 3/08* (2006.01)
*G01M 99/00* (2011.01)
(Continued)

(52) U.S. Cl.
CPC .............. *G01N 3/32* (2013.01); *G01B 11/002* (2013.01); *G01N 3/06* (2013.01); *G21C 3/334* (2013.01);
(Continued)

(58) Field of Classification Search
CPC ........ G01B 5/163; G01B 21/22; G01B 21/02; G01B 7/02; B23D 21/14; B23C 1/08;
(Continued)

(56) References Cited

U.S. PATENT DOCUMENTS 4,182,152 A    1/1980  Vaill et al.
4,748,854 A *  6/1988  Rao ........................... G01N 3/32
                                                            73/837

(Continued)

FOREIGN PATENT DOCUMENTS

KR    820001806 B1    10/1982
KR    100645446 B1    11/2006
(Continued)

*Primary Examiner* — Brandi N Hopkins
(74) *Attorney, Agent, or Firm* — Levenfeld Pearlstein, LLC

(57) ABSTRACT

Provided is an apparatus for fatigue testing a bulge tool having a WH-type skeleton, the apparatus including: a fixing bracket having tool holes penetrated through opposite sides thereof; a tool housing coupled to the tool hole of the fixing bracket and having the bulge tool inserted and installed therein; a moving rail installed at one side of the fixing bracket in a lengthwise direction of the tool housing and providing a reciprocating movement path facing the tool housing; a moving bracket reciprocating along the moving rail; a pusher protrudingly installed from the moving bracket toward the tool housing and moving in and out of the bulge tool; a measurement means installed between the pusher and the moving bracket, measuring a load applied to the bulge (Continued)

tool; and a drive means for generating power reciprocating the moving bracket on the moving rail.

6 Claims, 11 Drawing Sheets

(51) Int. Cl.
    *G01N 3/32*     (2006.01)
    *G01B 11/00*     (2006.01)
    *G01N 3/06*     (2006.01)
    *G21C 3/334*     (2006.01)

(52) U.S. Cl.
    CPC ............... *G01N 2203/0005* (2013.01); *G01N 2203/0019* (2013.01); *G01N 2203/0073* (2013.01); *G01N 2203/0252* (2013.01); *G01N 2203/06* (2013.01)

(58) Field of Classification Search
    CPC ...... G01R 31/50; G01R 31/003; A43D 21/18; A61B 17/00; G01M 13/025; G01M 99/007; G01M 13/00; G01L 3/26; G01N 3/32; G01N 3/04; G01N 3/20; G01N 3/00; E01B 31/18; G21C 17/06
    See application file for complete search history.

(56) References Cited

U.S. PATENT DOCUMENTS

| 6,023,980 | A | 2/2000 | Owen et al. |
| 8,950,268 | B2 * | 2/2015 | Ota ........................ G01N 3/08 |
| | | | 73/788 |
| 2013/0104707 | A1 * | 5/2013 | Nakagawa ............. B23B 25/06 |
| | | | 82/152 |
| 2017/0194064 | A1 | 7/2017 | Polidora et al. |

FOREIGN PATENT DOCUMENTS

| KR | 101012659 B1 | 2/2011 |
| KR | 101241786 B1 | 3/2013 |
| KR | 20130075500 A | 7/2013 |
| KR | 101381808 B1 | 4/2014 |

* cited by examiner

APPARATUS FOR FATIGUE TESTING BULGE TOOL HAVING WH-TYPE SKELETON

This is a National Stage Application of International Patent Application No. PCT/KR2018/006357, filed Jun. 4, 2018, which claims the benefit of and priority to Korean Application No. 10-2018-0052632, filed May 8, 2018, the entirety of which are incorporated fully herein by reference.

TECHNICAL FIELD

The present invention relates to an apparatus for fatigue testing a bulge tool having a WH-type skeleton and, more particularly, to an apparatus for fatigue testing a bulge tool having a WH-type skeleton, the apparatus being capable of easily and accurately measuring a fatigue level of a bulge tool by repeatedly applying a fatigue load to a bulge tool or a bulge tool prototype.

BACKGROUND ART

A nuclear fuel assembly is composed of: top and bottom fixtures compatible with upper and lower core plates, respectively, inside a reactor; a plurality of nuclear fuel rods; about 10 to 13 spacer grid assemblies that support the nuclear fuel rods and are arranged in a lengthwise direction of the nuclear fuel rods; and guide tubes and an instrumentation tube that are about 4 m length and are fastened to the spacer grid assemblies, thereby forming a skeleton.

Such nuclear fuel assemblies are provided in two types: a KSNP type and a WH type.

In the WH type out of the two nuclear fuel assembly types, the guide tube and the instrumentation tube are a long tube shape, and the spacer grid assembly 1 has a number of spaces 2 through which the guide tubes and instrumentation tube may penetrate as shown in FIG. 1. In other words, the WH type nuclear fuel assembly has a structure capable of forming a skeleton with many guide tubes and one instrumentation tube being inserted through the spacer grid assembly 1.

The guide tubes and instrumentation tube inserted in the spacer grid assembly 1 are fastened to the spacer grid assembly 1 to restrain the movement of the spacer grid assembly 1, wherein pipe jointing is being performed through a process called bulge as a fastening method at this time.

In the case of the KSNP type nuclear fuel assembly, the connection is made through spot welding when the guide tube or the instrumentation tube is connected to a sleeve of the spacer grid assembly 1. However, in the case of the WH type nuclear fuel assembly, the spot welding is unable to be performed, so the pipe jointing is performed through the bulge process.

For example, as shown in FIGS. 2 and 3, a sleeve 3 and a guide tube 4 simultaneously bulge in a radial direction so that the tube pipe jointing is accomplished using local plastic deformation.

A tool used at this time for the local plastic deformation of the sleeve 3 and the guide tube 4 is called a bulge tool, and the bulge tool is as shown in FIG. 4.

A bulge tool 10 is composed of a hollow cylinder having an outer diameter smaller than an inner diameter of the guide tube.

In addition, the bulge tool 10 forms a plurality of incised slots 11, and due to the formation of the slots 11, the bulge tool 10 may expand as the slots 11 are opened.

At this time, an end portion of the slots 11 forms a convex bulge portion 12.

When a taper pin 20 (refer to FIG. 8) is inserted into the bulge tool 10 after inserting the bulge tool 10 of such a configuration into the guide tube 4, the slots 11 of the bulge tool 10 are opened and induce plastic deformation of the guide tube 4 and the sleeve 3 by the bulge portion 12 as shown in FIG. 3, whereby the guide tube 4 and the sleeve 5 are fastened.

Meanwhile, a strong stress is applied on a boundary area between the bulge portion 12 and the slots 11, of the bulge tool 10, in a process of plastically deforming the guide tube 4 by an expansion of the slots 11. Accordingly, a risk of fracture of the boundary area is high in terms of stress concentration or fatigue failure due to works being repeatedly performed, which significantly affects a manufacturing process quality of the bulge tool.

In addition, due to a nature of a shape of the bulge tool 10, machining is not easy, and it is difficult to secure sufficient elongation while satisfying a high hardness value through heat treatment at the same time. Accordingly, in a situation where it is necessary to prepare technical measures for prevention of the stress concentration and fatigue failure and for suitable machining, a test for a bulge tool prototype is required.

DOCUMENTS OF RELATED ART

Patent Document

Korean Patent No. 10-0013474

DISCLOSURE

Technical Problem

Accordingly, the present invention has been made keeping in mind the above problems occurring in a related art, and an objective of the present invention is to provide an apparatus for fatigue testing a bulge tool having a WH-type skeleton, the apparatus being configured to allow not only a test for a bulge tool prototype to be performed combinedly but also a fatigue failure of a boundary area of a bulge tool to be easily and accurately measured, by counting the number of times a load is applied until fatigue failure occurs by concentrating stress by applying repetitive loads to the boundary area between a bulge portion and slots through repetitive movement of a pusher that goes in and out of the bulge tool by arbitrarily opening the slots of the bulge tool.

Technical Solution

In order to accomplish the above objective, the present invention may provide an apparatus for fatigue testing a bulge tool having a WH-type skeleton, the apparatus including: a fixing bracket having tool holes penetrated through opposite sides thereof; a tool housing coupled to the tool hole of the fixing bracket and having the bulge tool inserted and installed therein so as to expose a bulge portion of the bulge tool through one side thereof; a moving rail installed at one side of the fixing bracket in a lengthwise direction of the tool housing and providing a reciprocating movement path toward the tool housing; a moving bracket reciprocating along the moving rail; a pusher protrudingly installed from the moving bracket toward the tool housing and, moving in and out of the bulge tool by the reciprocating movement of the moving bracket; a measurement means installed between the pusher and the moving bracket, for measuring a load applied to the bulge tool while the pusher moves in and out of the bulge tool; and a drive means for generating power for reciprocating the moving bracket on the moving rail.

As another example to accomplish the above objective, the present invention may provide an apparatus for fatigue testing a bulge tool having a WH-type skeleton, the apparatus including: a fixing bracket having tool holes penetrated through opposite sides thereof; a moving rail installed at one side of the fixing bracket and providing a reciprocating movement path toward the fixing bracket; a moving bracket reciprocating in along the moving rail; a bulge tool prototype inserted through the tool hole of the fixing bracket and having slots located on an opposite side of the moving rail; a taper pin exposed to the moving rail side by passing through the inner side of the bulge tool prototype through the slots of the bulge tool prototype; a connection means connecting the taper pin exposed to the moving rail side and the moving bracket; a measurement means installed between the connection means and the moving bracket and measuring a load applied to the bulge tool prototype by the taper pin; and a drive means for generating power for reciprocating the moving bracket on the moving rail.

At this time, the connection means may include: a tool adapter screwed into the bulge tool prototype exposed to the moving rail side, and inserted into the tool hole to fasten the bulge tool prototype to the fixing bracket; and a taper pin adapter fastening the taper pin exposed to the moving rail side to the measurement means.

At this time, a plug may be fastened to a front end portion of the tool housing to prevent the bulge tool inserted in the tool housing from being separated from the tool housing, and a washer may be interposed between the plug and the tool housing to allow a distance between the plug and the tool housing to be changeable.

In addition, the apparatus may further include: a guide frame installed in a lengthwise direction of the moving rail on one side of the moving rail; a sensor installed on the guide frame to detect a position of the moving bracket; and a controller controlling the power of the drive means according to a detection of the position of the moving bracket by the sensor.

Advantageous Effects

As described above, the apparatus for fatigue testing a bulge tool having a WH-type skeleton according to the present invention has following effects.

First, since measuring a fatigue degree can be achieved for a boundary area between slots and a bulge portion constituting the bulge tool, there is an effect that a measure can be provided for optimal machining suitable for the prevention of stress concentration and fatigue failure.

Second, in measuring the fatigue degree of the bulge tool, it is provided to have an environment similar to that of a method, in which a guide tube is fastened to a sleeve of a spacer grid assembly, through repetitive movement of a pusher that goes in and out of the bulge tool, thereby improving the accuracy of the bulge tool fatigue measurement.

Third, there is an effect that measuring stress concentration and fatigue degree fracture for the bulge tool prototype can be made in advance.

Fourth, since one measuring device can be used to combinedly measure the fatigue degree fracture of the bulge tool and the fatigue degree fracture of the bulge tool prototype, it is possible to increase the efficiency of measuring the fatigue degree of the bulge tool.

BEST MODE

Terms and words used in the present specification and claims are not limited to usual or dictionary meanings. In addition, on the basis of a principle that the inventors may appropriately define a concept of the terms in order to describe their own invention in the best way, the terms and words should be interpreted as having a meaning and concept consistent with the technical idea of the present invention.

Hereinafter, an apparatus for fatigue testing a bulge tool having a WH-type skeleton according to an exemplary embodiment of the present invention will be described with reference to FIGS. 5 to 7b.

The apparatus for fatigue testing the bulge tool having the WH-type skeleton is a device that measures a fatigue load applied to a boundary area of the finished bulge tool and is able to combinedly perform a test of a bulge tool prototype.

Figure 1:
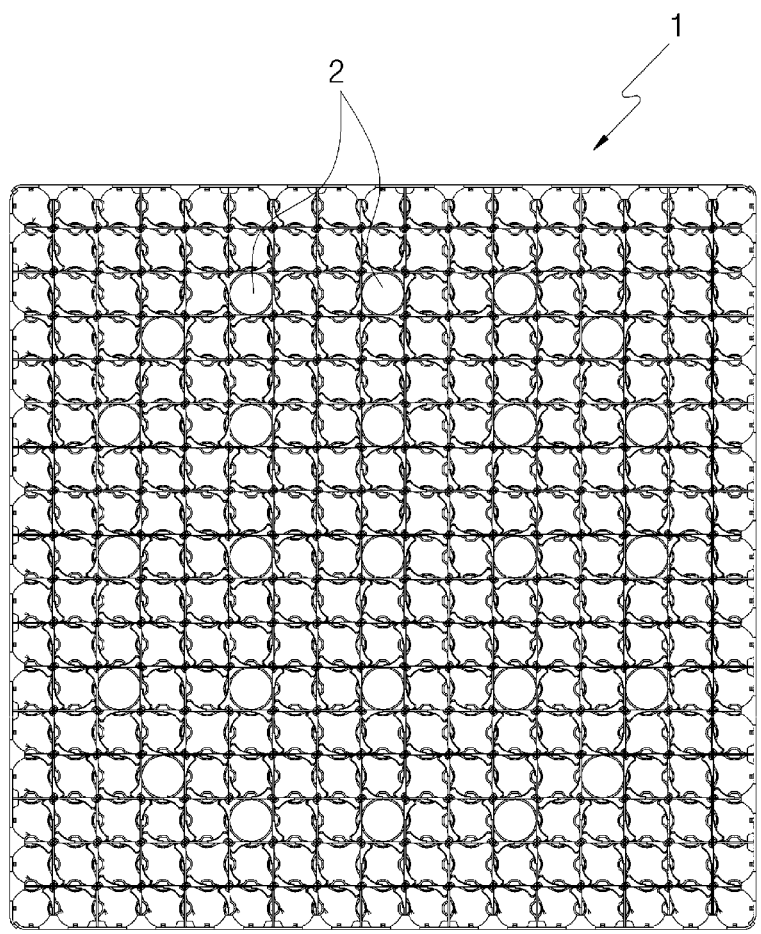
FIG. 1 is a plan view showing a spacer grid assembly of a WH type nuclear fuel assembly.
Figure 2:
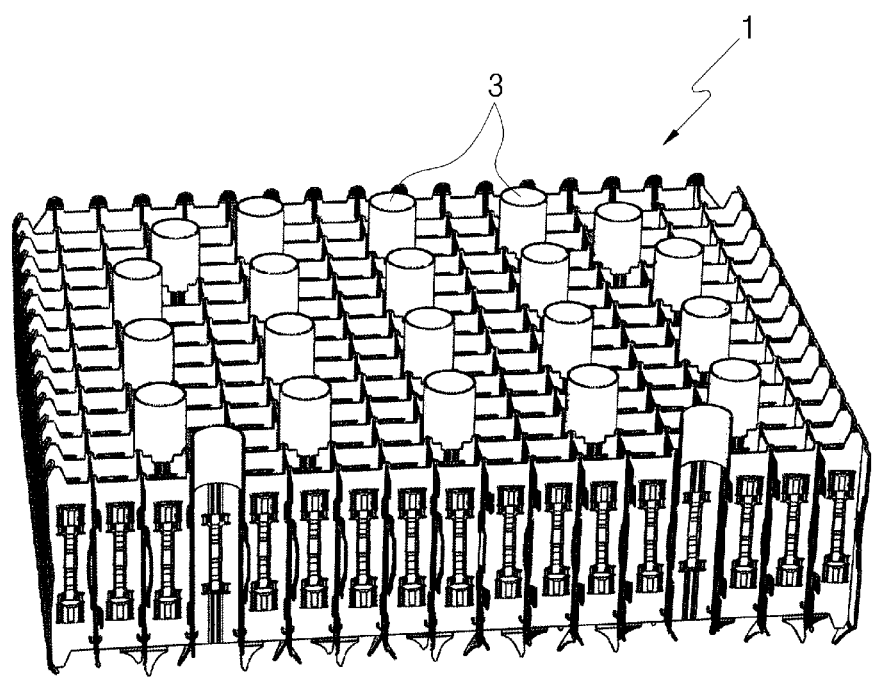
FIG. 2 is a partial perspective view showing by cutting a part of the spacer grid assembly of the WH type nuclear fuel assembly.
Figure 3:
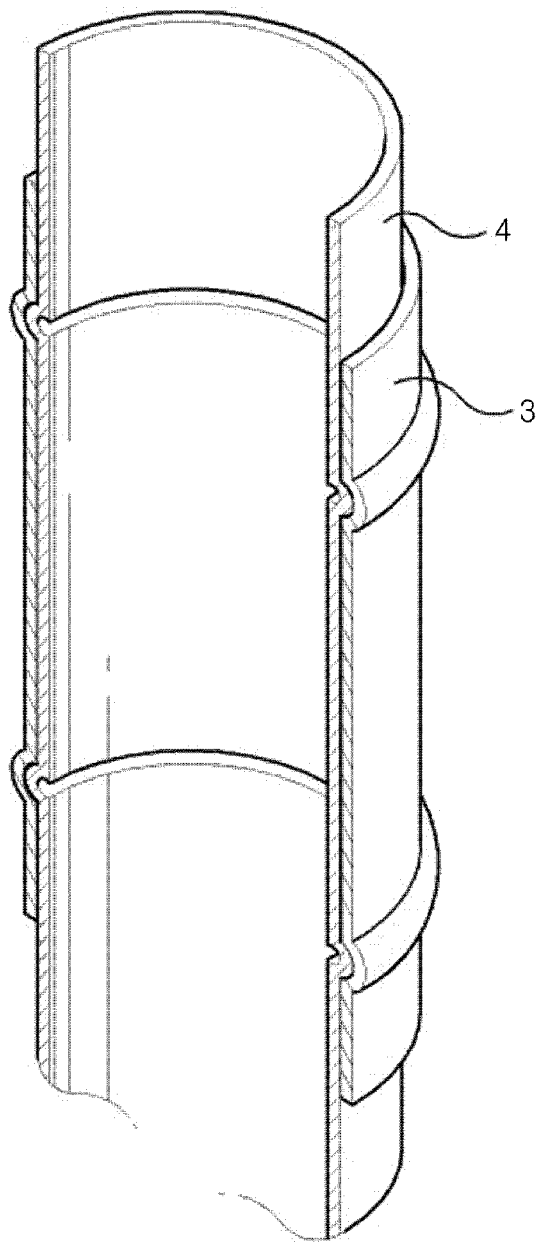
FIG. 3 is a partial perspective view showing by cutting a main part in a state in which the guide tube is fixed using a sleeve out of methods for fixing the guide tube to the spacer grid assembly of the WH type nuclear fuel assembly.
Figure 4:
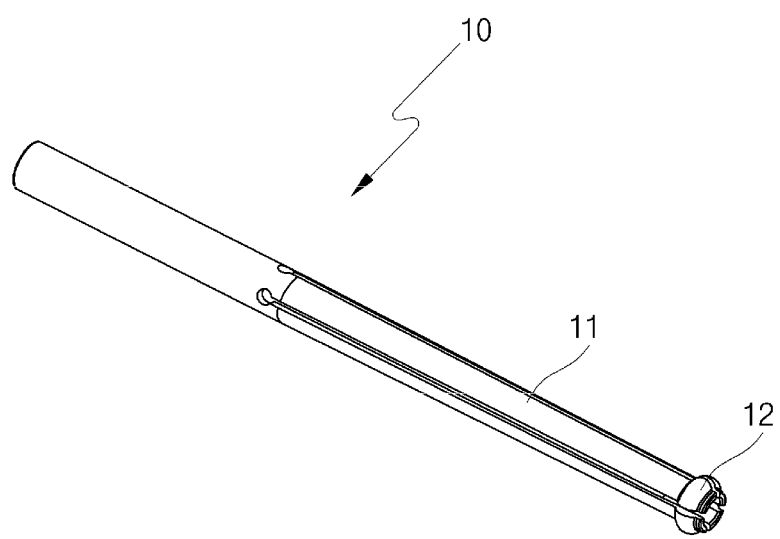
FIG. 4 is a perspective view showing a bulge tool that is a tool for fixing the guide tube to the sleeve.
Figure 5:
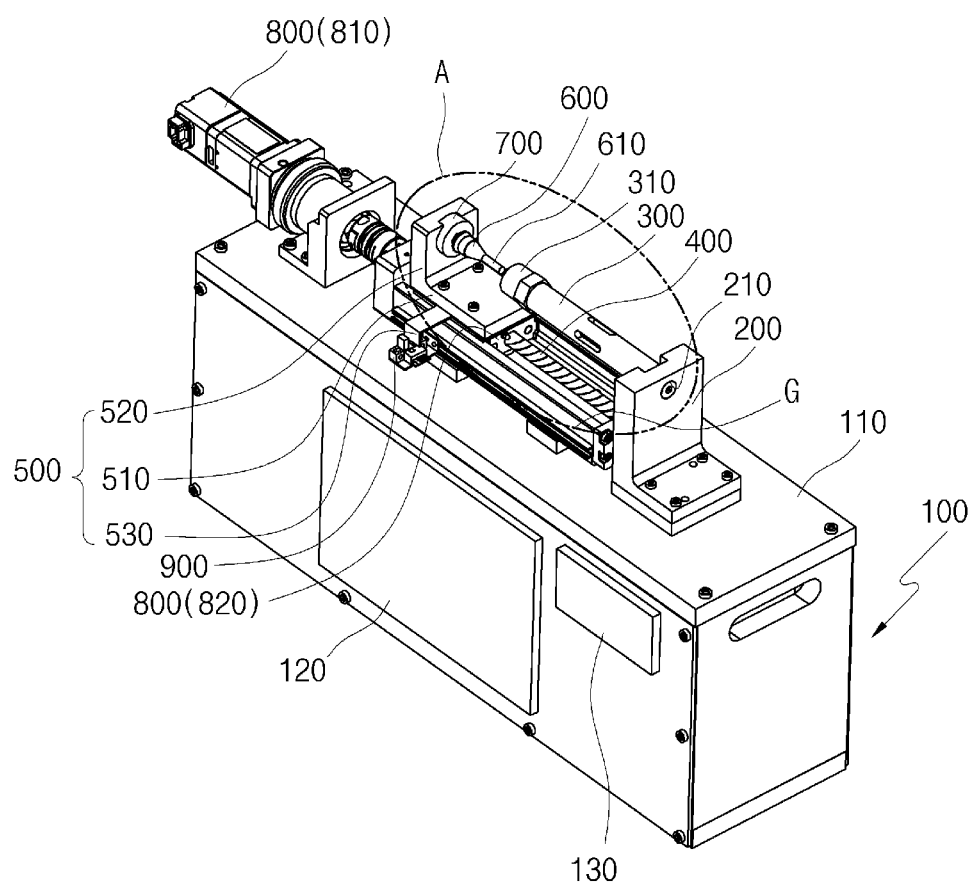
FIG. 5 is a perspective view showing an apparatus for fatigue testing a bulge tool having a WH-type skeleton according to an exemplary embodiment of the present invention.
Figure 6:
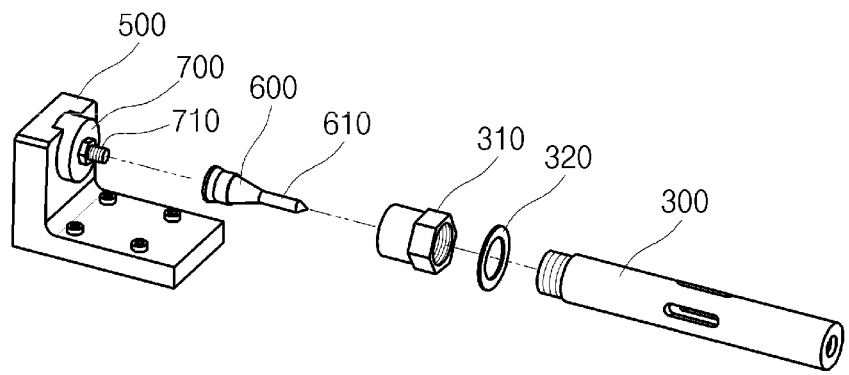
FIG. 6 is an exploded perspective view of a main part showing by exploding "A" of FIG. 5.

First, the apparatus for fatigue testing the bulge tool having the WH-type skeleton according to an exemplary embodiment, as shown in FIGS. 5 and 6, is configured to include a body frame 100, a fixing bracket 200, a tool housing 300, a moving rail 400, a moving bracket 500, a pusher 600, a measurement means 700, a drive means 800, and a sensor 900.

The body frame 100 is a part in which each component installed and is supported on the ground.

The body frame 100 may be made of a rectangular parallelepiped enclosure so that a fatigue degree is able to be measured with a sense of stability, and a top surface of the body frame 100 constitutes a flat base plate 110.

In addition, the body frame 100 is installed with a controller (not shown) for a measurement operation, a touch panel 120, a display unit 130, and the like.

Next, the fixing bracket 200 is provided for fixing the tool housing 300 and is installed on one side of the body frame 100.

At this time, a tool hole 210 penetrating through opposite sides is formed in the fixing bracket 200.

The tool hole 210 is provided as a fastening means for coupling the tool housing 300 in an exemplary embodiment and as a fastening means for coupling the bulge tool prototype in another embodiment.

Next, the tool housing 300 serves not only to fix a bulge tool 10 for measuring the fatigue degree but also to apply a load to the boundary area of the bulge tool 10 when a pusher 600 to be described later is inserted into the bulge tool 10.

The tool housing 300 is bolted to the tool hole 210 of the fixing bracket 200.

In addition, the tool housing 300 is coupled to protrude from the fixing bracket 200 and is formed in a hollow cylindrical shape.

That is, the tool housing 300 is configured to allow the bulge tool 10 to be inserted into an inner side thereof.

At this time, a plug 310 is coupled to a front end portion of the tool housing 300, that is, the front end portion being an opposite side of the side coupled to the fixing bracket 200, as shown in FIG. 6.

To this end, the front end portion of the tool housing 300 forms a male thread, and the plug 310 forms a female thread.

The plug 310 serves to prevent the bulge tool 10 inserted in the tool housing 300 from being separated from the tool housing 300.

The plug 310 is formed in a shape that opposite sides are penetrated through, and an inner diameter thereof is formed to be larger than an outer diameter of the bulge tool 10.

Accordingly, the bulge portion 12 of the bulge tool 10 inserted in the tool housing 300 is exposed to the outside of the plug 310 by being passed through the plug 310.

Meanwhile, a washer 320 may be further interposed between the tool housing 300 and the plug 310.

The washer 320 serves to separate the plug 310 and the tool housing 300, and the exposure range of the bulge tool 10 exposed through the plug 310 may be varied according to a separation distance between the tool housing 300 and the plug 310.

That is, in measuring the fatigue load on the boundary area of the bulge tool 10, it is intended to make the measurement range of the fatigue degree of the bulge tool 10 to be various while varying a range to which the fatigue load of the bulge tool 10 is applied, through the washer 320.

Next, the moving rail 400 provides a moving path of the moving bracket 500 to be described later and is installed from the fixing bracket 200 to a direction in which the tool housing 300 protrudes, on the base plate 110.

The moving rail 400 is configured to guide the moving path of the moving bracket 500 and may be installed to be rotated by the power of the drive means 800 to be described later.

To this end, the moving rail 400 may be provided as a screw.

Next, the moving bracket 500 serves to reciprocate the pusher 600 to be described later toward the tool housing 300 and is reciprocating along the moving rail 400.

The moving bracket 500 is installed to reciprocate on the moving rail 400 automatically through the power of the drive means 800.

The moving bracket 500 includes a moving part 510 corresponding to the moving rail 400 and a bent part 520 bent from the moving part 510 to correspond to a height of the tool housing 300.

Next, the pusher 600 is configured to arbitrarily apply force to the bulge tool 10 so that the fatigue degree of the bulge tool 10 may be measured by forcibly opening the slots 11 of the bulge tool 10 coupled to the tool housing 300.

The pusher 600 is installed on the moving bracket 500 and operates to go in and out relative to an inner side and outer side, respectively, of the bulge tool 10 by the reciprocating movement of the moving bracket 500.

The pusher 600 forms an insertion pin 610 so as to be smoothly inserted into the bulge tool 10, and the insertion pin 610 is formed to be inclined like a taper pin that actually expands the bulge tool 10.

At this time, the pusher 600 is configured to be detachably installed to the bent portion 520 of the moving bracket 500.

The detachable means of the pusher 600 is not specifically limited but may be provided in a screw fastening configuration as shown in FIG. 6.

Next, the measurement means 700 serves to measure the force the pusher 600 applies when the pusher 600 expands the bulge tool 10, and is installed on the moving bracket 500.

The measurement means 700 is installed on the bent portion 520 of the moving bracket 500 and is screwed with the pusher 600.

That is, the pusher 600 is fastened to the measurement means 700 installed accurately on the moving bracket 500.

Meanwhile, the measurement means 700 may be provided as a load cell, and as shown in FIG. 6, a male screw 710 protruding forward is formed on the load cell 700, and a female screw is formed in the pusher 600. Accordingly, the measurement means and the pusher are joined through being screwed to each other.

Next, the drive means 800 generates power to reciprocate the moving bracket 500 on the moving rail 400.

The drive means 800 may be configured to include a motor 810 and a moving block 820.

The motor 810 generates forward and reverse rotational power and is installed on an opposite side of the body frame 100.

The moving block 820 is installed under the moving bracket 500 and is screwed with the moving rail 400 configured as a screw.

That is, with this configuration, the moving block 820 reciprocates through screw rotation on the moving rail 400 according to the forward and reverse rotation of the motor 810.

At this time, since the moving block 820 is installed on the moving bracket 500, a reciprocating action of the moving bracket 500 may be understood.

A reciprocating mechanism of the moving bracket 500 through the drive means 800 is not limited to a screw type and may be configured using a linear motor and an LM guide.

Meanwhile, a guide frame G is installed in a lengthwise direction of the moving rail 400 on one side of the moving rail 400.

A sensor 900 for detecting a position of the moving bracket 500 is installed on the guide frame G, and the controller may control electric power of the motor 810 of the drive means 800 by detecting the position of the moving bracket 500 through the sensor 900.

That is, the forward and reverse rotation of the motor 810 is controlled according to the detection of the sensor 900.

At this time, the sensor 900 may be provided as a photo sensor.

To this end, the moving bracket 500 is installed with a sensing piece 530 that the photo sensor 900 is to detect.

Hereinafter, a manipulation of the apparatus for fatigue testing the bulge tool having the WH-type skeleton according to the exemplary embodiment of the present invention, composed of the above configuration, will be described with reference to FIGS. 7a and 7b.

The pusher 600 is screwed to the male screw 710 of the load cell 700.

In addition, the tool housing 300 is bolted to the tool hole 210 of the fixing bracket 200.

At this time, the insertion pin 610 of the pusher 600 faces the tool housing 300.

Next, the bulge tool 10 is inserted into the inner side of the tool housing 300.

At this time, the slots 11 of the bulge tool 10 enter into a state of being exposed to the outer side of the tool housing 300.

Next, the plug 310 is coupled to the tool housing 300 to prevent the bulge tool 10 from being separated from the tool housing 300.

At this time, in consideration of the fatigue load portion of the bulge tool 10 to be measured, a gap between the plug 310 and the tool housing 300 may be adjusted using the washer 320.

Figure 7A:
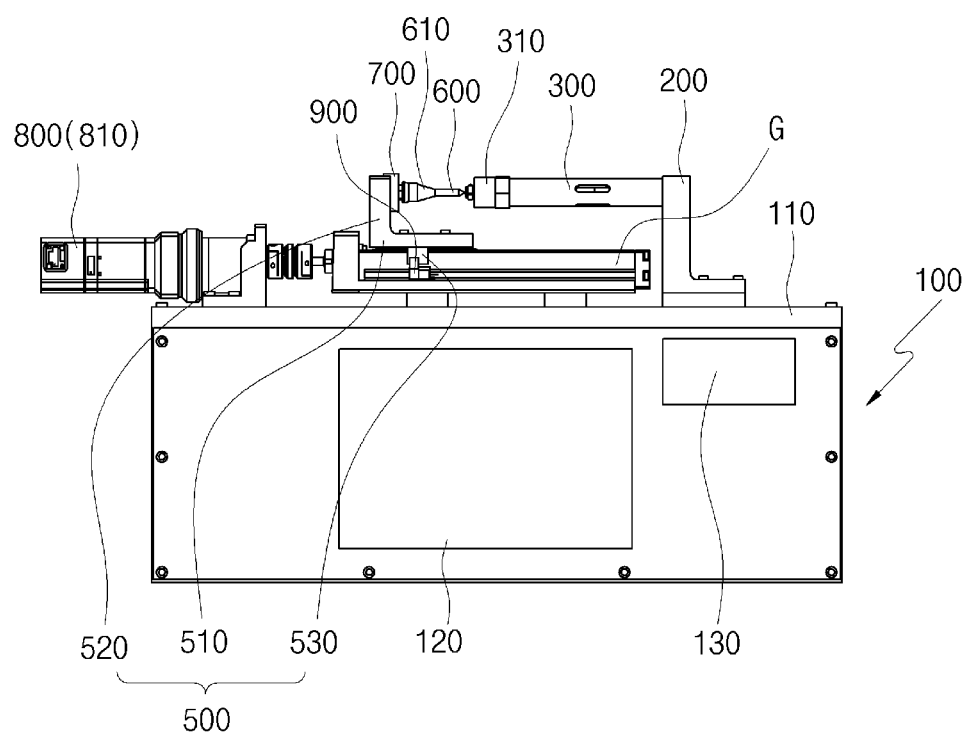
FIGS. 7a and 7b are action diagrams showing a state of measuring a fatigue degree of the bulge tool using the apparatus for fatigue testing the bulge tool having the WH-type skeleton according to the exemplary embodiment of the present invention.
Figure 7B:
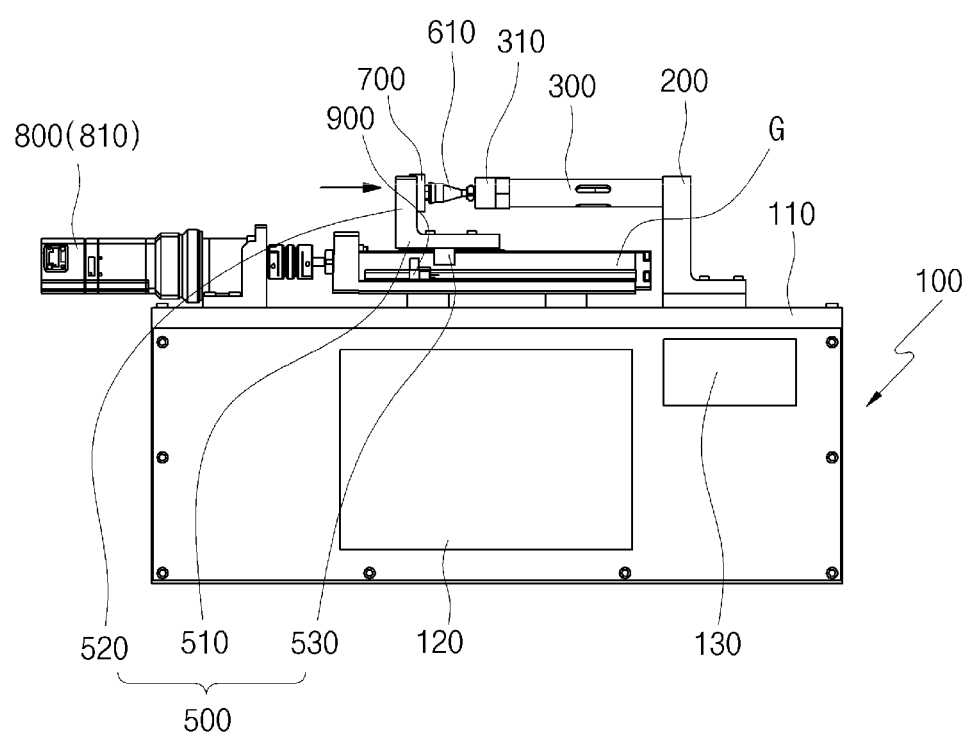

When the installation of the bulge tool 10 is completed as shown in FIG. 7a, the test apparatus is initiated to operate.

The screw 400 rotates by the rotational power of the motor 810, and the moving bracket 500 advances toward the tool housing 300 by the rotation of the screw 400.

Thereafter, the insertion pin 610 of the pusher 600 is inserted into the bulge tool 10 while opening the slots 11 of the bulge tool 10.

At this time, the slots 11 of the bulge tool 10 is open and interferes with the tool housing 300, more specifically, an inner circumferential surface of the plug 310, whereby an expansion is restrained.

This means that a fatigue load is being applied to the bulge tool 10.

Meanwhile, since the insertion pin 610 of the pusher 600 is in a state of being inserted in the bulge tool 10, the load cell 700 measures the load that the pusher 600 applies to the bulge tool 10.

Such a load of the pusher 600 is displayed through the display unit 130.

In this case, when the fatigue load value of the pusher 600 is displayed as the same as a preset reference value through the display unit 130, the motor 810 rotates in reverse, thereby moving the moving bracket 500 backward.

At this time, the photo sensor 900 detects the sensing piece 530 of the moving bracket 500, and the controller recognizes this and stops the rotational power of the motor 810.

Thereafter, such a series of processes are repeated, and the moving bracket 500 reciprocates repetitively and causes the pusher 600 to expand the slots 11 of the bulge tool 10.

Thereafter, when the fatigue load of the bulge tool 10 is destroyed, the measured value of the fatigue load applied by the pusher 600 to the bulge tool 10 decreases.

An operator recognizes this through the display unit 130 and calculates the fatigue load of the bulge tool 10 taking consideration of things such as the number of times that the fatigue load was applied to the bulge tool 10 through the pusher 600.

On the other hand, it is possible to perform a test of a bulge tool prototype using the above-described apparatus for fatigue testing the bulge tool having the WH-type skeleton.

This is presented as another embodiment of the present invention and will be described with reference to FIGS. 8 to 10b.

Prior to the description, reference numerals are parallelly used for the same technical configuration as in the exemplary embodiment above, and a detailed description will be omitted.

Figure 8:
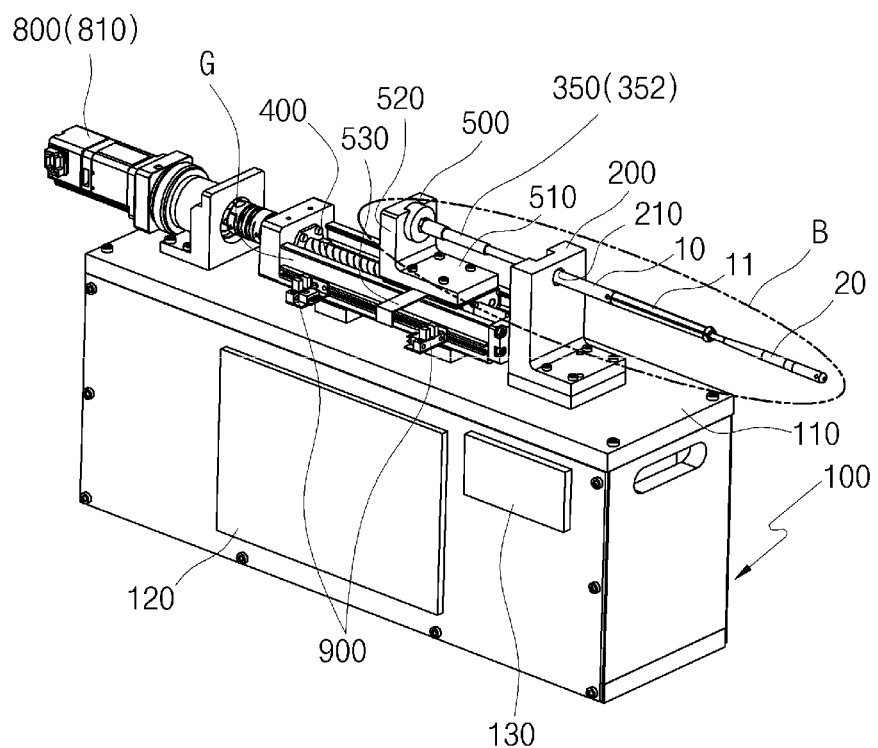
FIG. 8 is a perspective view showing an apparatus for fatigue testing a bulge tool having a WH-type skeleton according to another embodiment of the present invention.

As shown in FIG. 8, an apparatus for fatigue testing a bulge tool having a WH-type skeleton is configured to include a body frame 100, a fixing bracket 200, a moving rail 400, a moving bracket 500, a connection means 350, a measurement means 700, a drive means 800, and a sensor 900.

As may be seen above, in another embodiment, it is seen that the connection means 350 is provided instead of the pusher 600 and the tool housing 300.

The connection means 350 is configured to fix a taper pin 20 for expanding a bulge tool 10 and to fix the bulge tool 10 and may be coupled by being interchanged to the coupling site of the pusher 600 and the tool housing 300.

The connection means 350 may be composed of a tool adapter 351 and a taper pin adapter 352.

The tool adapter 351 serves to fix the bulge tool 10 to the fixing bracket 200.

The tool adapter 351 is formed with a through-hole penetrating through opposite sides, and a screw thread for screwing with the bulge tool 10 is formed on an outer circumferential surface of the tool adapter 351 formed with the through-hole.

The taper pin adapter 352 is a mediating means for fixing the taper pin 20, which is for expanding the bulge tool 10, to the moving bracket 400 and is screwed to a male screw 710 of the load cell 700 of the moving bracket 500.

A female screw for coupling with the load cell 700 is formed at an end portion of the taper pin adapter 352, and a male screw for coupling with the taper pin 20 is formed at an opposite end portion of the taper pin adapter 352.

Hereinafter, a manipulation for a test of the bulge tool prototype using the apparatus for fatigue testing the bulge tool having the WH-type skeleton, composed of the above configuration, according to another embodiment of the present invention will be described with reference to FIGS. 10a and 10b.

The taper pin adapter 352 is screwed to the male screw 710 of the load cell 700.

Next, the tool adapter 351 is inserted into a tool hole 210, and an opposite end portion of the bulge tool 10 is screwed to the outer peripheral surface of the tool adapter 351 exposed through the tool hole 210.

Accordingly, the bulge tool 10 enters into a state of being fixed to the tool hole 210 of the fixing bracket 200 through the tool adapter 351.

At this time, an inner path of the bulge tool 10 and an inner path of the tool adapter 351 are in a state of being penetrated through to each other.

Next, the taper pin 20 is inserted through the slots 11 formed at an end portion of the bulge tool 10.

Thereafter, the end portion of the taper pin 20 is exposed to the opposite side of the fixing bracket 200 through the inner path of the bulge tool 10 and the inner path of the tool adapter 351, and the operator screw-fastens the opposite end portion of the taper pin 20 to the male screw of the taper pin adapter 352.

Accordingly, the taper pin 20 enters into a state of being integrated with the taper pin adapter 352.

Figure 9A:
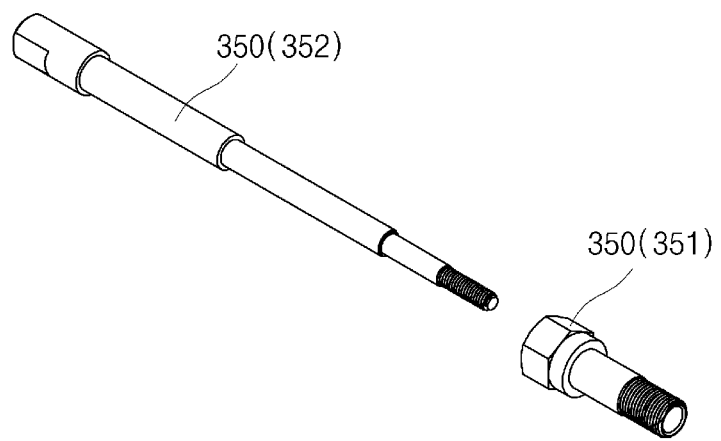
FIG. 9a is an exploded perspective view showing a part "B" of FIG. 8.
Figure 9B:
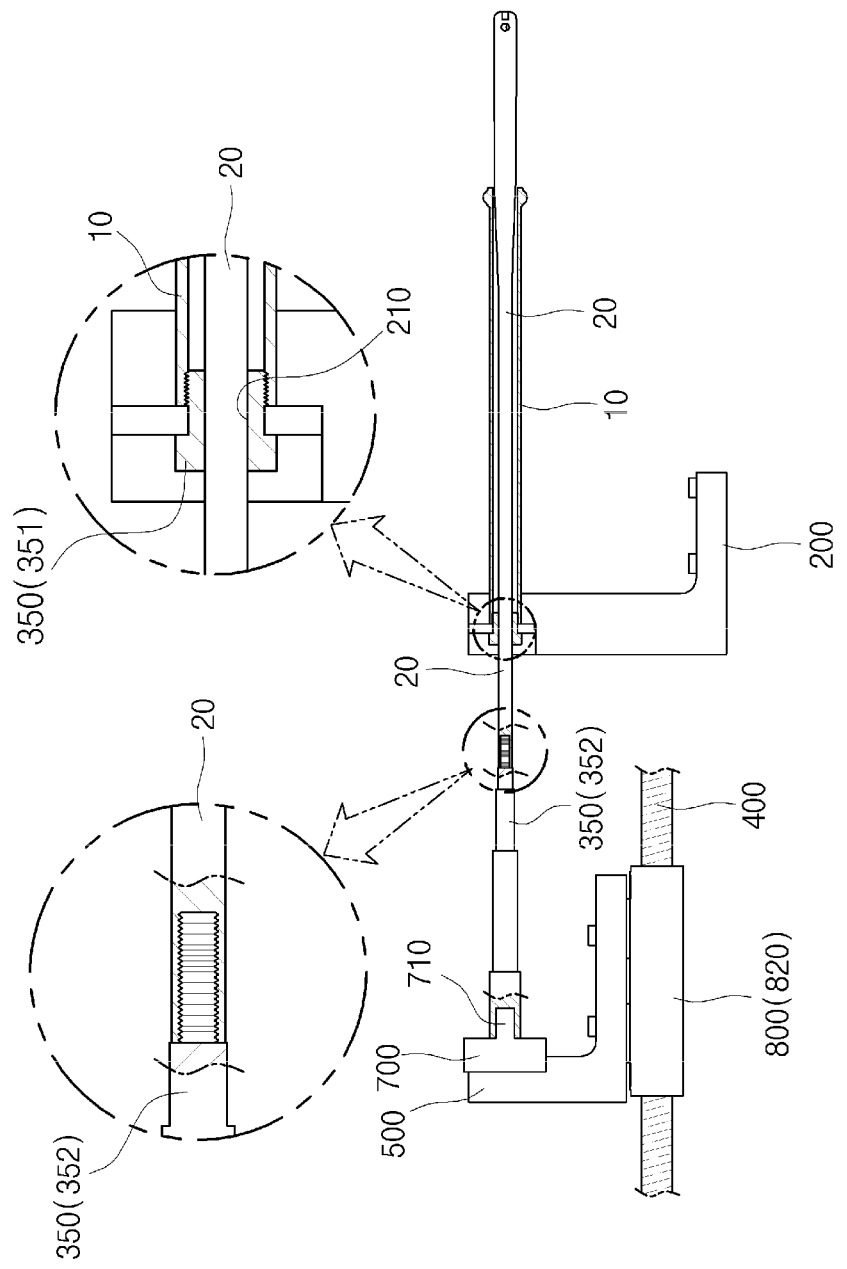
FIG. 9b is a sectional view showing the part "B" of FIG. 8.
Figure 10A:
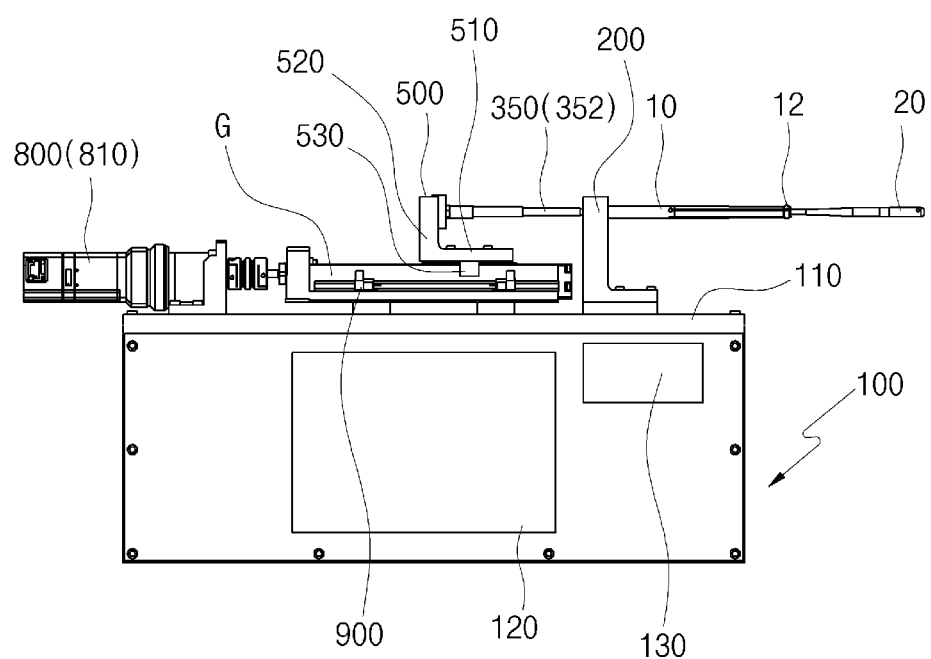
FIGS. 10a and 10b are action diagrams showing a state of measuring a fatigue degree of a bulge tool prototype using the apparatus for fatigue testing the bulge tool having the WH-type skeleton according to another embodiment of the present invention.

This may be understood through FIGS. 9b and 10a and is a state of being ready for a test of the bulge tool prototype.

In this case, the moving bracket 500 is in a state close to the fixing bracket 200 differently from the exemplary embodiment.

When measurement preparation work is completed as described above, the test apparatus is initiated to operate.

Figure 10B:
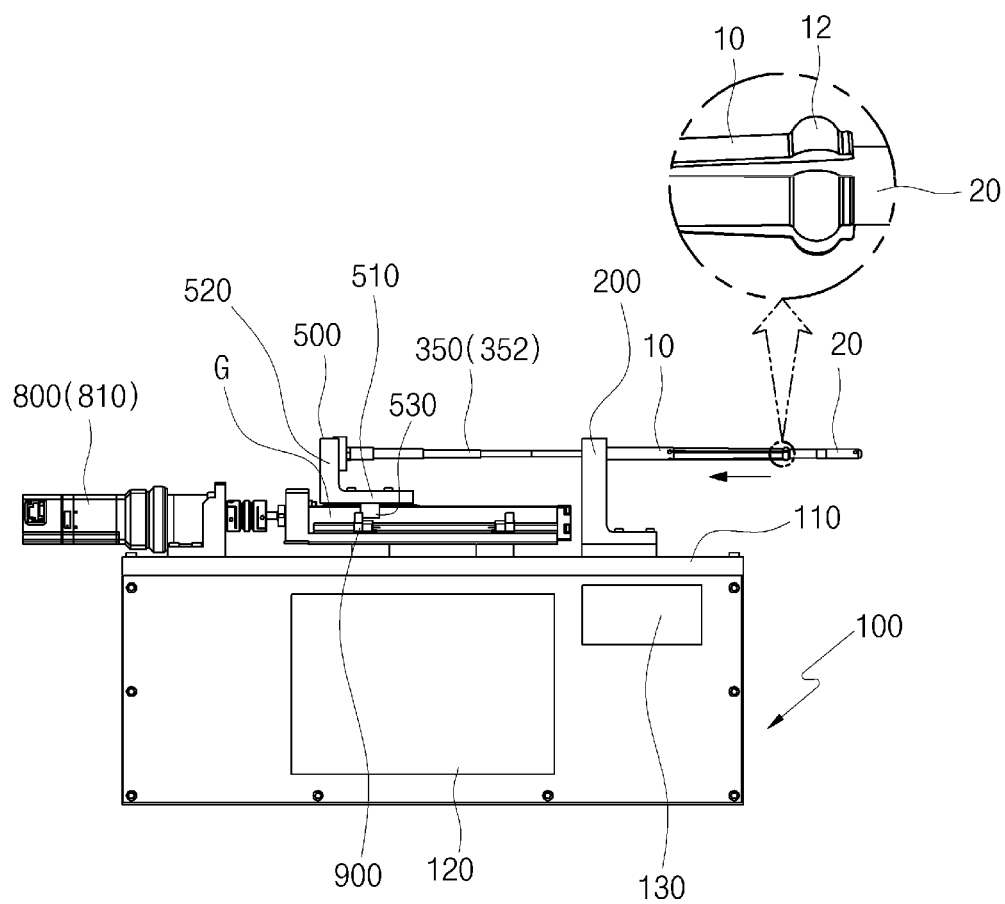

The screw 400 rotates by the rotational power of the motor 810, and the moving bracket 500 moves backward on the left side on a drawing as shown in FIG. 10b by the rotation of the screw 400.

At this time, while moving backward, the taper pin adapter 352 pulls the taper pin 20 inserted in the bulge tool 10.

At this time, while opening and expanding the slots of the bulge tool prototype 10, the taper pin 20 is gradually inserted into the inner side of the bulge tool prototype 10.

At this time, the load cell 700 measures a fatigue load of the bulge tool prototype 10 due to the resistant force, which is caused as the taper pin 20 inserted into the bulge tool prototype 10 is caught inside the bulge tool prototype 10.

Such measured values are displayed through the display unit 130.

Meanwhile, a position of the moving bracket 500 is controlled through the detection of the photo sensor 900 in a process that the moving bracket 500 moves backward.

That is, a pair of photo sensors 900 installed in a lengthwise direction of a guide frame G detect the forward and rearward positions of the moving bracket 500 so that excessive stress is not generated to the bulge tool prototype 10.

Thereafter, as a series of processes as described above are repeated, a test through measuring the fatigue load of the bulge tool prototype is performed.

In the above, even though the present invention has been described in detail with respect to the described embodiments, it is obvious to those skilled in the art that various changes and modifications are possible within the scope of the technical idea of the present invention. In addition, it is understood that such changes and modifications fall within the scope of the appended claims.

<Description of the Reference Numerals in the Drawings>

| | |
|---|---|
| 100: Body frame | 110: Base plate |
| 120: Touch panel | 130: Display unit |
| 200: Fixing bracket | 210: Tool hole |
| 300: Tool housing | 310: Plug |
| 320: Washer | 350: Connection means |
| 351: Tool adapter | 352: Taper pin adapter |
| 400: Moving rail (Screw) | 500: Moving bracket |
| 510: Moving part | 520: Bent part |
| 530: Sensing piece | 600: Pusher |
| 610: Insertion pin | 700: Measurement means (Load cell) |
| 710: Male screw | 800: Drive means |
| 810: Motor | 820: Moving block |
| 900: Sensor | G: Guide frame |
| 10: Bulge tool | 20: Taper pin |

The invention claimed is:

1. An apparatus for fatigue testing a bulge tool having a WH-type skeleton, the apparatus comprising:
   a fixing bracket having tool holes penetrated through opposite sides thereof;
   a tool housing coupled to the tool hole of the fixing bracket and having the bulge tool inserted and installed therein so as to expose a bulge portion of the bulge tool through one side thereof;
   a moving rail installed at one side of the fixing bracket in a lengthwise direction of the tool housing and providing a reciprocating movement path toward the tool housing;
   a moving bracket reciprocating along the moving rail;
   a pusher protrudingly installed from the moving bracket toward the tool housing and, moving in and out of the bulge tool by the reciprocating movement of the moving bracket;
   a measurement means installed between the pusher and the moving bracket, for measuring a load applied to the bulge tool while the pusher moves in and out of the bulge tool; and
   a drive means for generating power for reciprocating the moving bracket on the moving rail.

2. The apparatus of claim 1, wherein a plug is fastened to a front end portion of the tool housing to prevent the bulge tool inserted in the tool housing from being separated from the tool housing, and
   a washer is interposed between the plug and the tool housing to allow a distance between the plug and the tool housing to be changeable.

3. The apparatus of claim 1, further comprising:
   a guide frame installed in a lengthwise direction of the moving rail on one side of the moving rail;
   a sensor installed on the guide frame to detect a position of the moving bracket; and
   a controller controlling the power of the drive means according to a detection of the position of the moving bracket by the sensor.

4. An apparatus for fatigue testing a bulge tool having a WH-type skeleton, the apparatus comprising:
   a fixing bracket having tool holes penetrated through opposite sides thereof;
   a moving rail installed at one side of the fixing bracket and providing a reciprocating movement path toward the fixing bracket;
   a moving bracket reciprocating in along the moving rail;
   a bulge tool prototype inserted through the tool hole of the fixing bracket and having slots located on an opposite side of the moving rail;
   a taper pin exposed to the moving rail side by passing through the inner side of the bulge tool prototype through the slots of the bulge tool prototype;
   a connection means connecting the taper pin exposed to the moving rail side and the moving bracket;
   a measurement means installed between the connection means and the moving bracket and measuring a load applied to the bulge tool prototype by the taper pin; and
   a drive means for generating power for reciprocating the moving bracket on the moving rail.

5. The apparatus of claim 4, wherein the connection means comprises:
   a tool adapter screwed into the bulge tool prototype exposed to the moving rail side, and inserted into the tool hole to fasten the bulge tool prototype to the fixing bracket; and
   a taper pin adapter fastening the taper pin exposed to the moving rail side to the measurement means.

6. The apparatus of claim 4, further comprising:
a guide frame installed in a lengthwise direction of the moving rail on one side of the moving rail;
a sensor installed on the guide frame to detect a position of the moving bracket; and
a controller controlling the power of the drive means according to a detection of the position of the moving bracket by the sensor.

\* \* \* \* \*